2,953,599
DIMETHYLOLOXAMIDE

Richard P. Welcher, Old Greenwich, Conn., assignor to American Cyanamid Company, New York, N.Y., a corporation of Maine No Drawing. Filed Apr. 15, 1957, Ser. No. 652,677

5 Claims. (Cl. 260—561)

This invention relates to an improved process for preparing dimethyloloxamide. More particularly, it relates to a one step process for directly converting cyanogen to dimethyloloxamide in the presence of hydrogen ion.

It is known that dimethyloloxamide may be prepared by the reaction of oxamide and formaldehyde in the presence of a basic catalyst. The process is not entirely satisfactory from a commercial viewpoint. Its principal drawback is two fold. First, the use of basic catalyst leads to some loss of oxamide by hydrolysis to form oxamic acid. Second, the process requires the initial preparation, isolation and recovery of oxamide. This involves equipment tie-up, supervision and control, all necessitating increased costs in the manufacturing of the desired dimethyloloxamide ($-CONHCH_2OH)_2$. Since the latter compound finds utility as a valuable resin intermediate in the coating and textile finishing arts, it is an object of the invention to prepare dimethyloloxamide in a straightforward manner. Its preparation involving a simple, direct and economical process is, accordingly, highly desirable.

It has been unexpectedly discovered that the stated object can be attained by reacting cyanogen, a formaldehyde-yielding compound and an acidic catalyst in an aqueous menstruum. Thus, dimethyloloxamide is directly formed in good yield and purity. It has been expected that a methylene bisamide would form rather than dimethyloloxamide. The known reaction involving a nitrile, such as acetonitrile, an aldehyde such as formaldehyde and an acidic catalyst imparting hydrogen ions, usually results in the formation of methylene bisacetamide. In the present invention which is directed to the utilization of cyanogen as the nitrile reactant under similar conditions of reaction, dimethyloloxamide rather than the bisamide is principally formed.

To illustrate the process of the invention, the following example embodying the principal features thereof is presented. It is understood that the example is to be taken merely as illustrative and not as limitative.

Example 10 grams gaseous cynaogen (0.19 mole) is added to a mixture of 12 grams paraformaldehyde (0.40 mole) and 200 milliliters of hydrochloric acid (12 N). The addition of cyanogen to the aqueous acidic menstruum proceeds over a period of 40 minutes while cooling to maintain the reaction between about 28° C. and 32° C. A precipitate comprising dimethyloloxamide forms, and is filtered, washed with water and dried under a reduced pressure (100 mm. pressure). Resultant product weighs 12.3 grams, corresponding to a yield of 44% based on theory.

Resultant product, when heated, liquefies and decomposes at 245° C.–255° C. On infra-red spectra analysis, it is found to be identical with that of a known sample of pure dimethyloloxamide.

According to the stoichiometry of the reaction, two moles of formaldehyde per mole of cyanogen is necessary for reaction. However, a slight excess up to about 50 mole percent of formaldehyde may be advantageously used in order to insure completion of reaction and to assist in providing ease of operation.

Any formaldehyde-yielding compound may be employed. As disclosed in the example, paraformaldehyde is used. However, formaldehyde may be used directly, preferably in the form of a 27% aqueous solution.

The hydrogen ion supplied to the reaction in the process of the invention may emanate from a variety of both inorganic and organic acids, such as hydrochloric, sulfuric, nitric, phosphoric, benzoic, acetic and the like. The preferred acid is hydrochloric acid since it is readily available, is relatively inexpensive, and does not deleteriously affect the yield. The amount of acid to be supplied should be sufficient to maintain a strongly acidic medium, having a pH below about 4.

The reaction described is conducted at about room temperature and above (i.e., 20° C.–50° C.). Since the reaction is rather exothermic, cooling is required to maintain the temperature at this level. However, it has been found that at temperatures within the range of from about 20° C. to 35° C., reaction takes place within about sixty minutes and, therefore, constitutes a preferred practice.

Simplicity of reaction is discernible from the above description. It is therefore an advantage of the present process that dimethyloloxamide may be prepared directly without recovery of any intermediate reactant.

The utility of the prepared dimethyloloxamide is clearly illustrated in United States Letters Patent 2,364,-737. It is stated therein that N,N'-bis(hydroxymethyl) oxamide can be reacted with a monohydric alcohol at 0° C.–40° C. to form the corresponding bis(carboxamido)ether derivative which is a textile finishing agent.

I claim:

1. An improved process for the preparation of dimethyloloxamide which comprises: bringing into reactive combination cyanogen and a compound selected from the group consisting of formaldehyde and para-formaldehyde in an aqueous strongly acidic menstruum having a pH below about 4, maintaining the reaction at a temperature from about 20° C. to about 50° C. until reaction substantially ceases, and recovering thus-formed dimethyloloxamide.

2. The process according to claim 1 in which the compound is paraformaldehyde.

3. The process according to claim 1 in which the compound is aqueous formaldehyde.

4. The process according to claim 1 in which the ratio of cyanogen to the compound is 1:2–2.5, respectively.

5. The process according to claim 1 in which the acidic medium contains hydrochloric acid.

References Cited in the file of this patent

UNITED STATES PATENTS

| 1,194,354 | Bucher | Aug. 15, 1916 |

FOREIGN PATENTS

| 173,369 | Canada | Nov. 21, 1916 |

OTHER REFERENCES

Magat et al.: J.A.C.S., vol. 73, March 1951, p. 1031.
Magat: J.A.C.S., vol. 73, March 1951, pp. 1028–1031.
Magat: J.A.C.S., vol. 73, March 1951, pp. 1035–1037.
Einhorn: Justus Liebig's Annalen der Chemie, vol. 343 (1905), pp. 207, 213, 214, 218, 219, 252, 265, 267, 270, 272, 273, 277.
Schmidt: Ber. vol. 1 (1868), p. 66.